Oct. 1, 1968 A. W. KANT 3,403,521

CABLE PLOW

Filed Sept. 14, 1966 2 Sheets-Sheet 1

INVENTOR.
ALVIN W. KANT

BY Edhoff and Slick

ATTORNEYS

INVENTOR.
ALVIN W. KANT
BY Eckhoff and Slick
ATTORNEYS

United States Patent Office 3,403,521
Patented Oct. 1, 1968

3,403,521
CABLE PLOW

Alvin W. Kant, Oakland, Calif., assignor to American Tractor Equipment Corporation, a corporation of California Filed Sept. 14, 1966, Ser. No. 579,358
1 Claim. (Cl. 61—72.6)

ABSTRACT OF THE DISCLOSURE

The cable plow is connected to the towing vehicle by means of a shank and a yoke which straddles a transversely extending sliding beam. The sliding beam has telescopic relation with a center beam pivotally carried by the frame of the vehicle. The yoke is pivotally connected to the sliding beam on the forward side thereof and to the shank on the rearward side of the sliding beam. Separate power means are employed to pivot the center beam upwardly, to move the sliding beam transversely, and to pivot the shank.

At the present time the use of cable plows for the burying of electrical, telephone and similar cables has largely supplanted the trenchers and back fillers which were formerly used. The present invention relates to an improved form of cable plow.

In accordance with the present invention, a cable plow is provided wherein the shank is free to pivot, thus keeping the plow always pointed into the direction of travel. By allowing the shank to pivot freely, the power requirements of the towing vehicle are reduced as well as the steering and braking effort.

In accordance with another aspect of the invention a pitch adjusting means is provided on the shank which permits control of the fleet angle between the plow and the cable preventing sharp bends and tension on the cable. This is particularly important when the cable is being laid in rough terrain.

In accordance with one aspect of the present invention an offset cable laying device is provided so that one can lay cables adjacent to a property line, building, fence or the like. Further, with such an offset device, it is possible to use a wheeled vehicle on the road and lay the cable on the shoulder or in a side ditch.

In accordance with another aspect of the present invention, a readily detachable cable laying device is provided which does not interfere with the use of the towing vehicle for other purposes.

Although the device of the present invention is ordinarily mounted on a crawler type tractor, it can also be mounted on a wheel type vehicle such as a road grader with the attendant advantages of a rubber tired vehicle.

Other features and objects will be brought out in the balance of the specification.

In the drawings forming part of this application:

Figure 1:
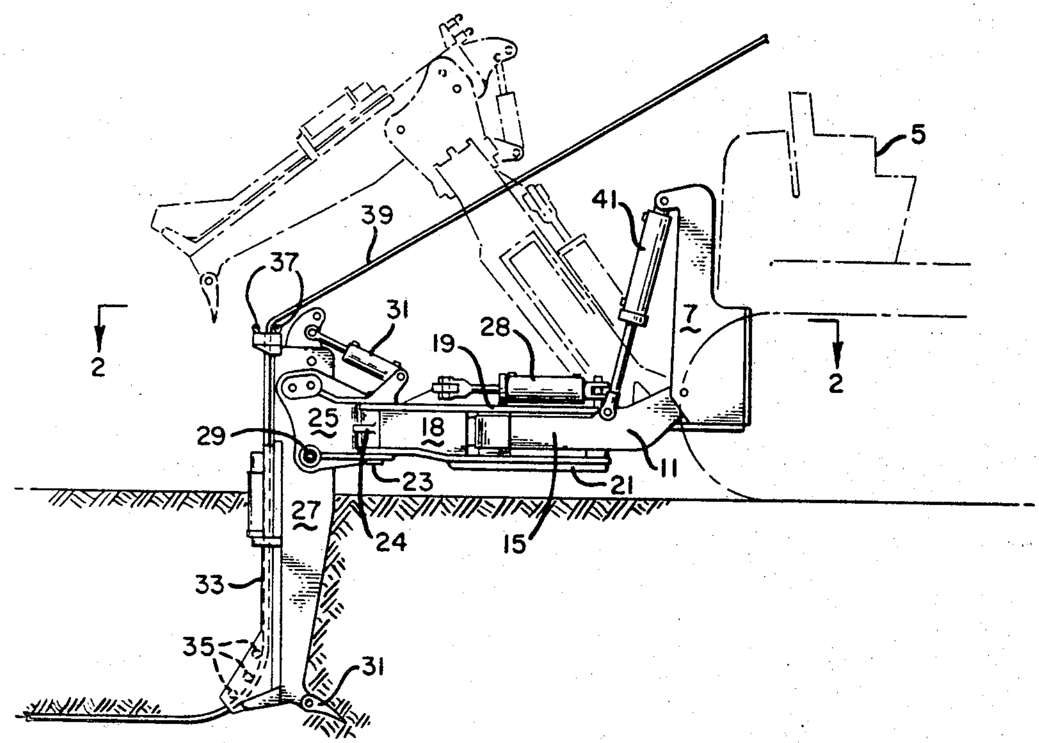
FIGURE 1 is an embodiment of the present invention which is particularly adapted for use with crawler type vehicles and wherein the cable is to be laid either in the path of the vehicle or only slightly offset therefrom.
Figure 2:
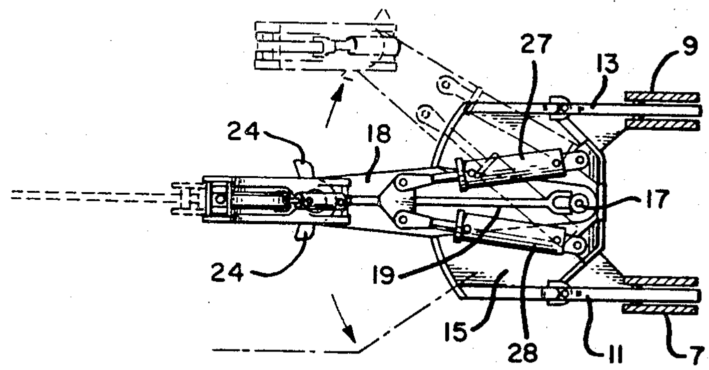
FIGURE 2 is a plan view on the line 2—2 of FIGURE 1.

Referring now to the drawings by reference characters and particularly to FIGURES 1 and 2, there is shown in phantom a suitable towing vehicle 5 of the crawler type. Mounted on the rear of the towing vehicle are a pair of brackets 7 and 9 with arms 11 and 13 pivoted thereon. Arms 11 and 13 support a frame member 15. On the forward part of frame 15 is the pivot pin 17 to which is pivoted the upper yoke arm 19 and the lower yoke arm 21 which lie over the frame 15 and which join to form yoke 18. At the rear of yoke 18 is a pivot pin 23 to which the shank bracket 25 is pivoted. At least one hydraulic cylinder is connected between frame member 15 and yoke 18 to move the yoke from side to side as is shown in phantom in FIGURE 2. Preferably two cylinders namely 27 and 28 are employed for this purpose. Bracket 25 is free to pivot on the pivot 23 for the ease of steering and the like, and this angle is ordinarily limited to about 20–90° of movement my means of the stops 24 on yoke 18. The shank proper 27 is pivoted at point 29 to the bracket 25 while hydraulic cylinder 31 is provided which is attached between the front end of bracket 25 and the top of the shank. This permits the adjustment of the angle which the shank makes with the ground and thus controls the fleet angle.

The shank itself includes a replaceable tooth 31 of conventional design and at the rear of the shank a cable tube 33 is provided. Bottom guide rollers 35 are employed so that the cable is payed out smoothly while top guide rollers 37 prevent binding at the top of the cable tube. Thus, the cable 30 passes between the rollers 37, down the protective tube 33, over the rollers 35 and is deposited in the ground. Hydraulic cylinders 41 are connected between the framework 7 and the arms 11 and 13 so that the whole assembly can be raised as is shown in phantom in FIGURE 1 for transportation.

In soft soil of moderate depths, the operation can be completed with a single pass although at greater depths and in hard ground a prebreaker plow may be employed in front of the cable laying plow.

Figure 3:
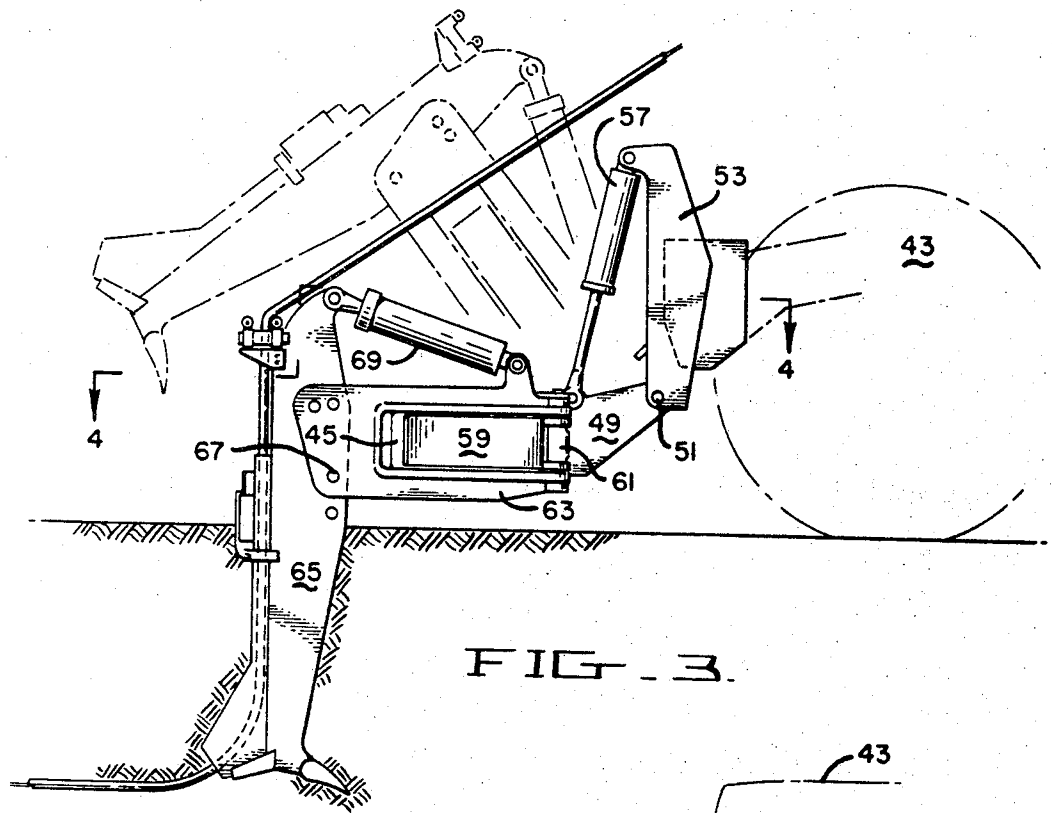
FIGURE 3 is another embodiment of the invention which is particularly adapted for mounting on wheeled vehicles, particularly where it is desired that the cable be laid in a path off to one side of the path of travel of the vehicle.
Figure 4:
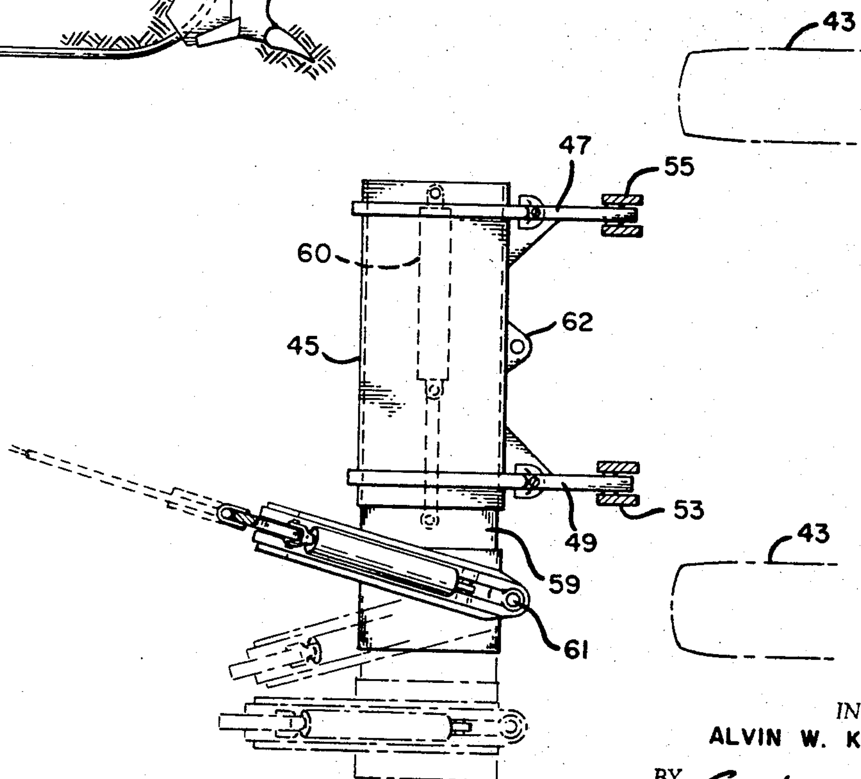
FIGURE 4 is a plan view on the line 4—4 of FIGURE 3.

In the embodiment of the invention shown in FIGURES 3 and 4 a somewhat different system is employed although the basic principles are the same. This device is primarily adapted for use with a wheeled vehicle, such as a road grader although naturally it could be employed with a crawler type vehicle. Only the wheels 43 of the vehicle are shown in phantom. This embodiment of the invention includes a center tool beam assembly generally designated 45 which is supported on the arms 47 and 49 which are pivoted at point 51 on frame members 53 and 55 mounted on the vehicle. The center beam 45 can be raised and lowered by the hydraulic cylinders 57 and a sliding beam assembly 59 telescopes within the center beam. Sliding beam 59 can be extended or drawn in by means of hydraulic cylinder 60. An extended position is shown in phantom in FIGURE 4. Near the outer end of the sliding beam assembly is the pivot point 61 to which the yoke 63 is pivoted. The shank 65 is pivoted at point 67 to the yoke 63 while the hydraulic cylinder 69 is attached between the forward part of the yoke 63 and the top of the shank 65. It will thus be seen that the action of the device shown in FIGURES 3 and 4 is substantially the same as that shown in FIGURES 1 and 2; the yoke 63 is free to pivot over the point 61 and the extent of the freedom of motion is limited only by the depth of the yoke in comparison with the width of the sliding beam 59. The angle which the shank makes with the ground is controlled by the cylinder 69 which serves the same function as the hydraulic cylinder 31 previously described. In addition, center beam 45 is provided with a pivot point 62 so that yoke 63 can be connected to this point at the center line of the vehicle.

The structure of the shank 65 is substantially the same as the shank 27 and is therefore not described in detail. When not in use, the assembly is lifted by means of the hydraulic cylinders 57 to the position shown in phantom in FIGURE 3.

It is believed apparent from the foregoing that I have provided an improved form of cable laying device wherein the shank is free to pivot and thus to tow easier and to steer easier and wherein the angle which the shank makes with the ground can be varied so that the fleet angle is under control at all times.

I claim:

1. In a cable plow having a towing vehicle and a shank connected thereto, said shank having forwardly directed plow means and rearwardly directed cable laying means, a frame carried by said towing vehicle, a center beam carried by the frame for pivotal movement about a transverse axis, a sliding beam telescopically received in said center beam for transverse movement, a yoke straddling said sliding beam, one end of said yoke pivotally connected to the sliding beam on the forward side thereof for horizontal swinging movement, said shank being pivotally connected to the other end of the yoke on the rearward side of said sliding beam for pivoting about a transverse horizontal axis, power means pivoted to the upper end of said shank and to the forward end of said yoke for pivoting said shank about its transverse axis and separate power means for pivoting said center beam and for transversely moving said sliding beam, whereby the shank may be held in operative position or swung upwardly out of operative position.

References Cited

UNITED STATES PATENTS

| | | | |
|---|---|---|---|
| 3,140,745 | 7/1964 | Hinkle et al. | 172—292 |
| 3,175,368 | 3/1965 | Tibbits | 61—72.6 |
| 3,170,300 | 2/1965 | Kelley | 61—72.6 |
| 3,232,358 | 2/1966 | Heiberg | 61—72.6 X |
| 3,307,363 | 3/1967 | Kinnan | 61—72.6 |
| 3,348,383 | 10/1967 | Kelley | 61—72.6 |

EARL J. WITMER, *Primary Examiner.*